July 1, 1930. P. SHISHKOFF 1,768,716
UTILIZATION OF THE ENERGY OF TIDES, WAVES, OR CURRENTS
Filed Oct. 4, 1926  2 Sheets-Sheet 2
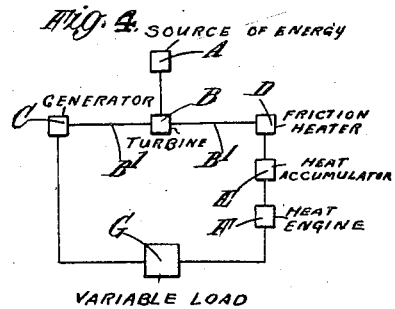
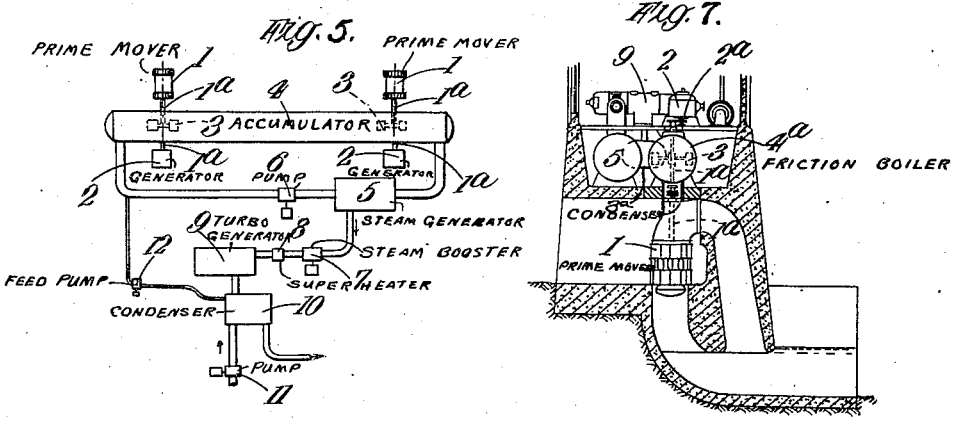
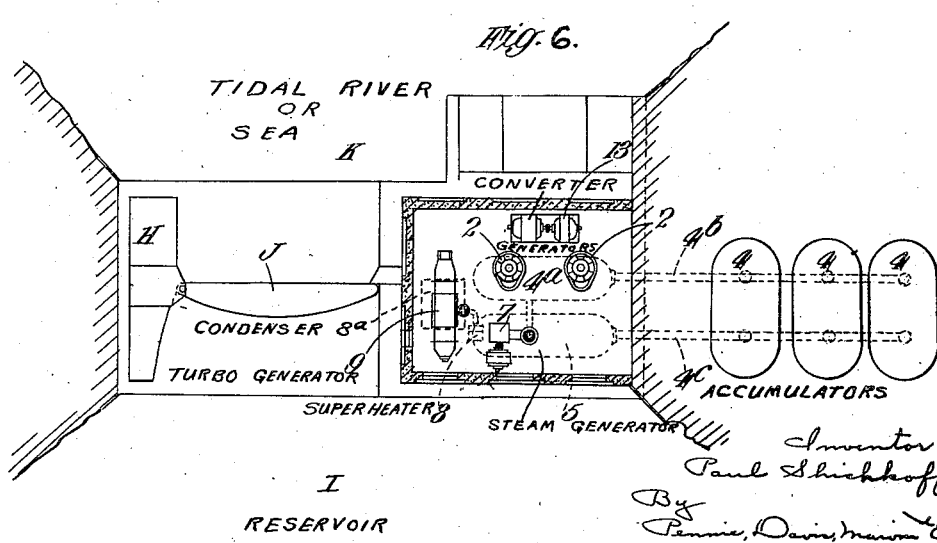

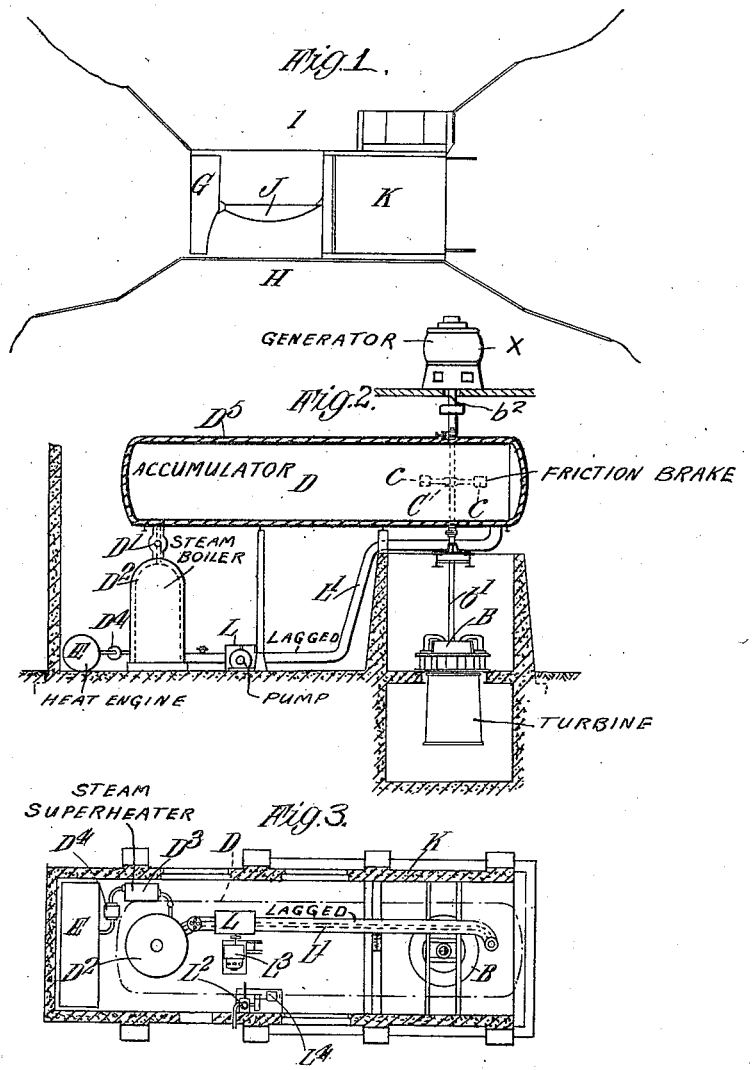

Patented July 1, 1930

1,768,716

UNITED STATES PATENT OFFICE

PAUL SHISHKOFF, OF WESTMINSTER, LONDON, ENGLAND

UTILIZATION OF THE ENERGY OF TIDES, WAVES, OR CURRENTS

Application filed October 4, 1926, Serial No. 139,394, and in Great Britain October 8, 1925.

This invention relates to apparatus for the utilization of sources of hydraulic power such as tides, waves or currents and has for its object an improved form of apparatus for enabling the energy in such sources to be utilized for the production of large quantities of steam which may be employed for various purposes.

According to the invention the apparatus comprises a water motor driven from a source of hydraulic power, a friction device or devices driven by the water motor and moving in an aqueous medium, and an electric generator all connected to a common shaft and means whereby the heated water produced by the friction device is converted into steam.

The water motor may be constituted by any mechanical device of suitable character which is capable of being actuated from a source of hydraulic power, such as a water turbine, a wave mill, tide mill, or the like, and the friction device or devices may comprise propellers, paddles, vanes, or the like, which are adapted to be rotated in a liquid medium so as to generate heat which is absorbed by the medium which may be water. The energy stored in the medium may by converting the latter into steam be utilized as and when required to operate a power transmission or power generating device or in any other convenient manner.

Where it is proposed to utilize the energy of tides as the source of hydraulic power a dam, breakwater, jetty, pier or the like may be provided with sluice gates or their equivalent which are opened to the incoming tide and which are closed at high tide; water motors being provided and located within or in the proximity of the dam or the like, so that, as, or when, the tide recedes, the water motors are driven by the flow of water from the upper to the lower level of the water. Alternatively, the sluice gates may be opened at high tide so as to allow the water to flow through water motors into the dam or reservoir so as to drive the same, the same motors or other water motors being again driven when the tide falls, by the flow of water from the upper to the lower level of the water. The propellers, screws or other friction developing devices, may be located within tubes, reservoirs or heat accumulators situated in a power house or building or resting on or in the dam or the like and containing a suitable fluid such as water, which will serve to absorb the heat which is generated. The said tubes, reservoirs or heat accumulators are sufficiently strong to resist any desired degree of pressure and are jacketed in any suitable manner to reduce heat radiation losses to a minimum. The tubes, reservoirs or heat accumulators may be provided with valves adapted to open when the pressure therein has risen to a predetermined value so as to allow the water to escape into an expansion chamber where it is converted into steam, the steam, after being superheated if necessary, being then utilized in an engine, mechanically, electrically, chemically, or otherwise.

Pumps may also be employed for returning to the heat accumulators the water which does not form steam or which is produced by the condensation of the steam in the expansion chamber or steam generator.

Alternatively, and instead of locating the friction generating devices in the heat accumulators or storage tubes, I may locate the same within an apparatus which I term a friction boiler, said boiler being constituted by a chamber or chambers containing devices capable of generating heat by friction, said devices being driven by water motors and revolving in water or some other fluid contained in the said friction boilers. Said boilers may deliver water at high pressure and temperature to heat storage chambers or accumulators and an expansion chamber or steam generator may be provided in communication with the heat storage chamber wherein the water is converted into steam, the water which does not form steam or which condenses in the said chamber being returned by means of a pump or otherwise to said friction boilers wherein its temperature is again raised and the liquid reenters the heat storage chambers.

Instead of storing up in the form of heat the whole of the mechanical energy derived from the utilization of tides, waves or currents any desired percentage of said mechanical energy can be utilized to drive directly any power generating device such as an electric generator.

To this end, and according to a further feature of the present invention the prime mover is adapted to drive simultaneously through a mechanical connection, such as a shaft, a direct current generator, as also friction devices for transforming mechanical energy into heat energy, the latter being stored up in a heat accumulator and employed as and when required to drive the aforesaid direct current generator by means of a heat engine, or preferably, a separate heat engine such as a turbo-electric generator.

Owing to the fact that there is a common mechanical connection between the prime mover, the direct current generator and the friction devices, the power absorbed by the friction devices varies as the cube of the velocity of the prime mover; and it follows that even a small variation of speed will greatly vary the amount of heat energy produced by the friction device. Therefore if an excess of energy is available from the prime mover over that which is absorbed by the direct current generator the tendency would be for the velocity of rotation to increase until the excess will be absorbed by the friction devices.

When however the energy from the prime mover begins to fall, less and less of its available energy will be in excess of the direct current generator element and the speed of the prime mover and friction device will fall. It also follows that if the electrical load on the generator falls, its speed will increase and simultaneously there will be an increase in the speed of rotation of the friction devices with a consequent increase in the amount of heat absorbed by the liquid in the accumulator. The friction devices will thus act as an equalizer and control automatically the distribution, between the direct current generator and the heat accumulator, of the total energy available from the prime mover.

In order that the said invention may be clearly understood and readily carried into effect, the same will now be described more fully with reference to the accompanying drawing in which—

Figure 1 is a diagrammatic illustration of a reservoir into which the sea is admitted at high tide, and out of which the water may flow at low tide through power absorbing devices constructed according to the present invention.

Figure 2 is a partly diagrammatic view showing a power absorbing plant constructed according to the present invention, and Figure 3 is a plan view of Figure 2, the heat accumulator being shown in line and dot.

Figure 4 illustrates diagrammatically a power absorbing plant constructed according to a further embodiment of the present invention.

Figure 5 is a lay-out of another modified form of the present invention.

Figure 6 is a partly diagrammatic view showing a power absorbing plant constructed according to the present invention, and Figure 7 is a sectional end view of Figure 6.

Referring to Figures 1, 2 and 3, G is a dam which separates a reservoir H from the sea or from a tidal river I. J is a sluice gate which is opened at high tide to allow water to flow into the reservoir H and at low tide the water is allowed to flow from the reservoir H through a water turbine B, located in a power house K. The turbine B through the shaft $b^1$ drives a friction device C located within the heat accumulator D and a generator of power-absorbing device X connected to an extension $b^2$ of shaft $b^1$. When the temperature and pressure of the water within the heat accumulator D have been raised to a sufficient extent the water at high pressure and temperature, is allowed to escape, through a reducing valve $D^1$, into an expansion chamber or steam generator $D^2$, where, owing to the reduced pressure prevailing within the said chamber part of the water is converted into steam. The steam enters a steam superheater $D^3$, which may be heated in any desired manner, and from thence it passes to the turbo-electric generator E. A steam booster $D^4$ may also be provided. L is a circulating pump for removing the water which does not form steam and which accumulates in the lower part of the steam generator $D^2$ and returning the same through a lagged pipe $L^1$ to the heat accumulator D. $L^2$ is a feed pump for supplying water to the heat accumulator D to replace the water which is removed in the form of steam from the heat accumulator D. The circulating pump L and the feed pump $L^2$ are driven by electric motors $L^3$ and $L^4$. The heat accumulator D is in the form of a cylindrical steel tank with hemispherical ends and its volume is sufficiently large in comparison with its exterior surface that lagging of insulation $D^5$ of from 4 to 6 inches in thickness is sufficient to reduce the heat losses to a negligible amount. The energy stored up in the form of heat in the accumulator D is released as and when required in the form of steam, thus accommodating for wide fluctuations in steam demand over a long period of time. Furthermore its use renders possible the absorption of all fluctuations between the output of energy from the friction generating device C (Fig. 2) and the demands for steam from the heat engine E, and it also permits steam at a definite temperature and pressure to be applied to the heat engine.

The friction generating device C, in the example shown at Figure 2 is constituted by a pair of paddles $c, c$ rotatably mounted on the shaft $b^1$ driven by the water turbine B.

It has been found that in order to absorb

1000 H. P. at 100 revolutions per minute, in cases where the blades are situated at a distance of 3 feet from the axis of rotation, the total blade area which is necessary is approximately 14 square feet, or say two blades each 2.6′ by 2.6′. The maximum pressure reached within the heat accumulator, should not exceed approximately 200 lbs. per square inch as this pressure is generally considered to be the maximum for cylindrical boilers, and the minimum pressure should not be less than 10 lbs. per square inch as this pressure is about the lowest at which a steam turbine will work efficiently. In the first instance the equivalent temperature will be 388° F. and in the latter case 240° F., representing a temperature drop of 148° F. between the maximum and minimum pressures. The storing capacity of a ton of water is therefore $148 \times 2240 = 330,000$ B. t. u.'s or, allowing 1100 B. t. u.'s per lb. of steam, 300 lbs. of steam. Assuming 13 lbs. of steam per kilowatt hour to be the minimum consumption of a large turbo-generator working at pressures varying from 200 lbs. to 10 lbs., the total storing capacity of a ton of water will in this case be $\frac{300}{13} = 23$ kilo-watt hours.

Referring to Figure 4, A indicates a discontinuous source of hydraulic energy; B is a water turbine; C is a direct current generator; D is a friction device rotating in a liquid medium, the heat energy which is generated being stored up in a heat accumulator E; F is a heat engine such as a turbo-electric generator which derives heat energy from the heat accumulator E and G is a variable load liable to be on at all times; $B^1$ is a mechanical connection, such as a shaft driven by the water turbine B and adapted to drive both the direct current generator C, and also the friction devices D. As long as sufficient power is available from the discontinuous source of energy A to drive the water turbine B both the direct current generator C and the friction devices D will be driven by the common shaft $B^1$. As the available energy from the discontinuous source A fails less and still less of the energy available from the water turbine B will be absorbed in the form of heat energy by the liquid in which the friction devices rotate, and at such times most of the available energy from the water turbine B will be employed to drive the direct current generator C. During the rotation of the friction devices D energy will be stored up in the heat accumulator E and when sufficient energy is not available from the water turbine B to drive the direct current generator C the latter is cut out and thereafter the turbo-electric generator F is supplied with heat energy from the heat accumulator E. Consequently, a constantly available source of electrical energy at the load G will be available at all times either from the direct current generator C or from the heat engine F.

In the modified arrangement at Figure 5, 1, 1 are prime movers such as water turbine; 2, 2 are a pair of direct current generators and 3, 3 are friction devices rotating in a heat accumulator 4. Each direct current generator and each friction device 3, is located on a common shaft $1^a$, $1^a$. 5 is a steam generator supplied with water from the heat accumulator 4. 6 is a circulating pump for returning the water which does not form steam to the accumulator 4; 7 is a steam booster; 8 is a steam superheater; 9 is a turbo-generator; 10 is a condenser; 11 is a circulating pump for the feed water and 12 is a feed pump for returning the condensed water to the heat accumulator 4.

In the practical embodiment of the invention shown at Figures 6 and 7 which corresponds substantially to the layout shown at Figure 5, 1, 1 are a pair of prime movers, one only being shown at Figure 7. 2, 2 are direct current generators; 3 (Figure 7) is one of a pair of friction devices each friction device being mounted upon a shaft $1^a$ driven by a double-rotor water turbine 1. Through gearing $2^a$ the shaft $1^a$ also drives the direct current generator 2. The friction devices 3 rotate in a liquid, such as water, in a friction boiler $4^a$. The heat accumulator is part of the boiler $4^a$ and has a permanent connection with it and through the pipe $4^b$ the water passes to the heat accumulators 4, 4. From the accumulators 4, 4 the water is allowed to pass along a pipe $4^c$ into the expansion chamber or steam generator 5 where, owing to the reduced pressure prevailing within said chamber, part of the water is converted into steam. The steam enters the steam superheater 8 and from thence it passes to the turbo-electric generator 9. The steam superheater 8 is heated in any desired manner and a condenser $8^a$ is provided for condensing the steam from the turbo-electric generator and returning the same to the friction boiler $4^a$. H is a dam which separates a reservoir I from the sea or from a tidal river K, J is a sluice gate which is opened at high tide to allow water to flow into the reservoir I and at low tide this water is allowed to flow from the reservoir I through the water turbines 1, 1.

Normally the turbo-electric generator 9 will not be operated and the current necessary to supply the load which is liable to be on at all times is supplied by the direct current generators 2, 2. When the electrical energy available from the direct current generators 2, 2 is insufficient, or non-existent, the turbo-electric generator 9 is brought into use and is run on the energy stored up in the heat accumulators 4. 13 is a motor generator set or converter for transforming direct current into alternating current or alternating current into direct current as required, thus providing a complete self contained unit on the site where the discontinuous supply of hydraulic power is available.

By means of the present invention a continuous source of energy can be obtained from a discontinuous source of hydraulic power in a much more economical manner than has heretofore been possible. Furthermore the entire conversion plant is self-contained and can be located on the spot where the tidal energy is available. Consequently, the use of large reservoirs at higher levels, such as has been proposed in the past in connection with other schemes for utilizing a discontinuous source of hydraulic energy, is rendered unnecessary.

The invention can advantageously be utilized in combination with dams, piers, jetties, breakwaters or the like, adapted to fulfill their normal functions as such, but provided with sluice gates so as to form a dam or dams, as when so used, the additional cost involved in fitting said dams, jetties, breakwaters or the like, with the present invention is not prohibitive and provides a cheap source of energy.

What I claim and desire to secure by Letters Patent of the United States is:—

In an organization comprising a driven shaft and power-absorbing means operated by said shaft, a combined heat-accumulator and steam generator plant comprising a closed water tank of substantial capacity and a friction brake applied to said shaft and disposed in heat-exchange relation with the water in said tank.

PAUL SHISHKOFF.